US012659672B2

(12) United States Patent
Higgins et al.

(10) Patent No.: US 12,659,672 B2
(45) Date of Patent: Jun. 16, 2026

(54) EAR-WEARABLE HEARING DEVICE

(71) Applicant: STARKEY LABORATORIES, INC., Eden Prairie, MN (US)

(72) Inventors: Sidney A. Higgins, Maple Grove, MN (US); David Fabry, Eden Prairie, MN (US); Fue Yang, Minneapolis, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 18/667,320

(22) Filed: May 17, 2024

(65) Prior Publication Data

US 2024/0305933 A1 Sep. 12, 2024

Related U.S. Application Data

(63) Continuation of application No. 17/800,092, filed as application No. PCT/US2021/019680 on Feb. 25, 2021, now Pat. No. 12,022,258.

(Continued)

(51) Int. Cl.
*H04R 1/10* (2006.01)
*H04R 25/02* (2006.01)

(52) U.S. Cl.
CPC ........... *H04R 25/02* (2013.01); *H04R 1/1016* (2013.01); *H04R 2460/11* (2013.01)

(58) Field of Classification Search
CPC .......... H04R 1/08; H04R 1/083; H04R 1/086; H04R 2410/07; H04R 2225/025; H04R 2225/77
See application file for complete search history.

(56) References Cited

U.S. PATENT DOCUMENTS 1,668,890 A 5/1928 Curran
4,800,982 A * 1/1989 Carlson ................ H04R 25/654 381/328

(Continued)

FOREIGN PATENT DOCUMENTS

CN 203446028 U * 2/2014
CN 206611578 U * 11/2017

(Continued)

OTHER PUBLICATIONS

PCT Search Report and Written Opinion for Application No. PCT/US2021/019680 dated Jun. 2, 2021 (10 pages).

(Continued)

*Primary Examiner* — Ryan Robinson
(74) *Attorney, Agent, or Firm* — Mueting Raasch Group

(57) ABSTRACT

An ear-worn electronic device comprises a housing, electronic circuitry, a power source, a microphone, and a receiver or speaker. The housing comprises a nozzle dimensioned for deployment within at least a portion of an ear canal. The nozzle comprises a distal portion, a proximal portion, a cavity within the nozzle, and a terminus surface at the distal portion comprising a sound port through which sound can pass out of the nozzle. The nozzle comprises an acoustical vent arrangement comprising a proximal port provided at the proximal portion, a plurality of distal ports provided at the terminus surface, and at least a portion of the nozzle cavity in fluid communication with the proximal port and the distal ports. Each of the distal ports has a volume smaller than that of the proximal port, and a volume of the proximal port is substantially equal to that of the distal ports cumulatively.

20 Claims, 6 Drawing Sheets

Related U.S. Application Data

(60) Provisional application No. 62/981,814, filed on Feb. 26, 2020.

(56) References Cited

U.S. PATENT DOCUMENTS

| | | | | | |
|---|---|---|---|---|---|
| 4,887,693 | A * | 12/1989 | Plice | H04R 1/086 381/189 |
| 5,357,576 | A * | 10/1994 | Arndt | H04R 25/652 381/328 |
| 5,572,594 | A | 11/1996 | Devoe | |
| 5,889,874 | A * | 3/1999 | Schmitt | H04R 25/602 381/328 |
| 5,987,146 | A | 11/1999 | Pluvinage | |
| 6,307,943 | B1 | 10/2001 | Yamagishi | |
| 6,549,635 | B1 | 4/2003 | Gebert | |
| 7,694,418 | B2 * | 4/2010 | Topholm | H04R 25/658 29/896.21 |
| 8,139,806 | B2 | 3/2012 | Hosaka | |
| 8,150,084 | B2 * | 4/2012 | Jessen | H04R 25/402 381/381 |
| 8,311,253 | B2 | 11/2012 | Silvestri | |
| 8,406,447 | B2 | 3/2013 | Kromann | |
| 8,737,664 | B2 | 5/2014 | Tiscareno | |
| 8,774,435 | B2 | 7/2014 | Ambrose | |
| 9,237,394 | B2 | 1/2016 | Seo | |
| 10,009,680 | B2 | 6/2018 | Briggs | |
| 10,154,331 | B2 | 12/2018 | Houle | |
| 11,381,898 | B2 | 7/2022 | Choi | |
| 11,540,041 | B2 | 12/2022 | Kuipers | |
| 2002/0196954 | A1 * | 12/2002 | Marxen | H04R 25/658 381/328 |
| 2006/0067556 | A1 | 3/2006 | Bailey | |
| 2007/0201717 | A1 | 8/2007 | Dyer | |
| 2007/0253587 | A1 | 11/2007 | Ostrowski | |
| 2008/0013767 | A1 | 1/2008 | Olsen | |
| 2009/0123010 | A1 | 5/2009 | Cano | |
| 2012/0097475 | A1 | 4/2012 | Schumaier | |
| 2013/0148830 | A1 | 6/2013 | Sakaguchi | |
| 2013/0243209 | A1 | 9/2013 | Zurbruegg | |
| 2017/0094427 | A1 | 3/2017 | Higgins | |
| 2022/0201378 | A1 | 6/2022 | Monahan | |

FOREIGN PATENT DOCUMENTS

| | | | | |
|---|---|---|---|---|
| DE | 4107861 | A1 * | 9/1991 | |
| DE | 19942707 | | 3/2001 | |
| EP | 2076064 | | 4/2017 | |
| JP | 2012023669 | A * | 2/2012 | |
| KR | 20080021776 | A * | 3/2008 | |
| WO | WO-2022024654 | A1 * | 2/2022 | B81B 7/0058 |

OTHER PUBLICATIONS

Stevenson et al., "Spatial design of Hearing Aids Incorporating Multiple Vents," Trends in Hearing, 2014, vol. 18 1-10.

* cited by examiner

*Figure 1*
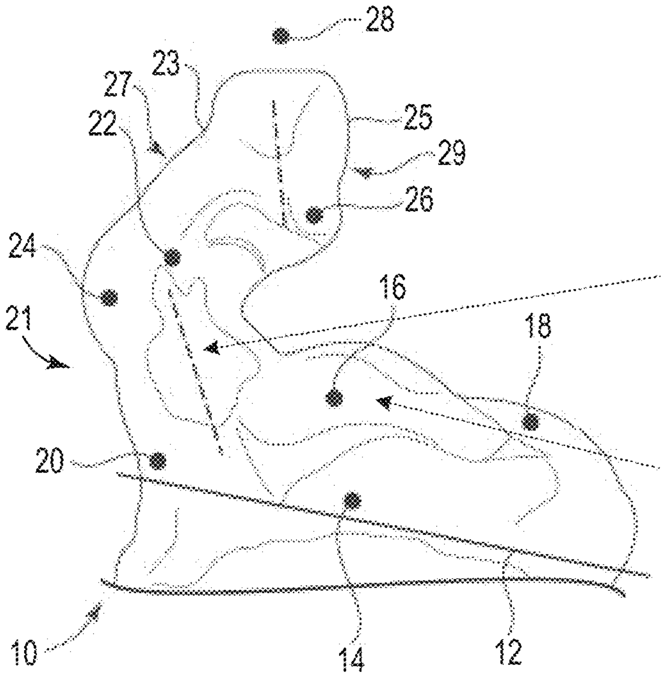
*Figure 2*
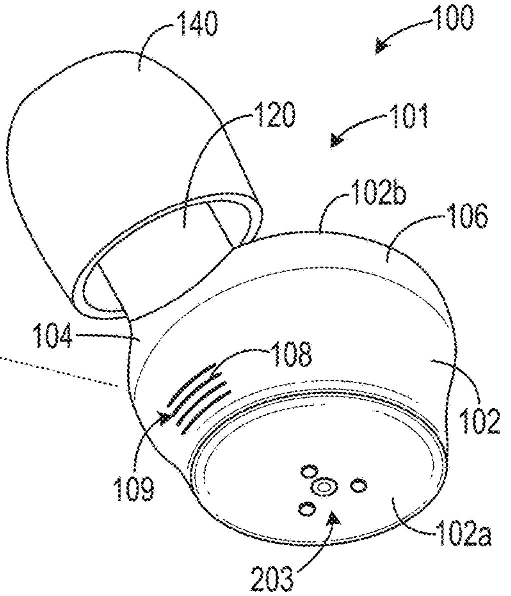
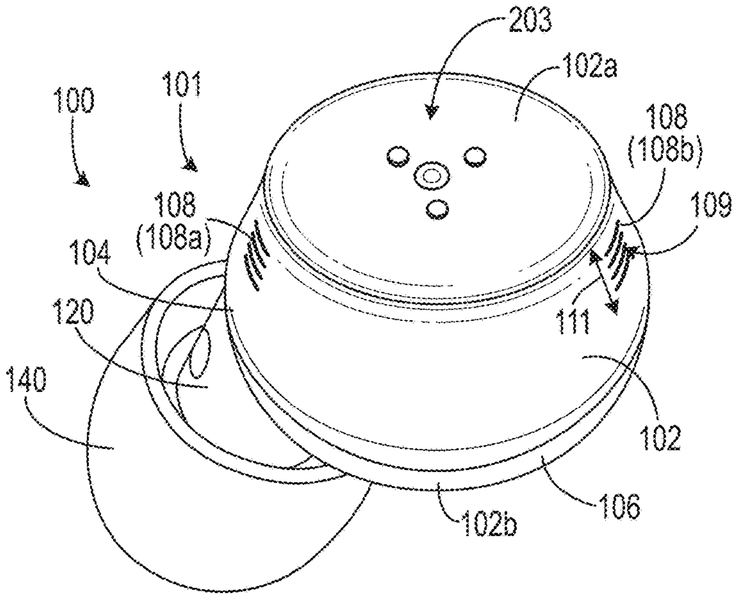
*Figure 3*

Figure 4
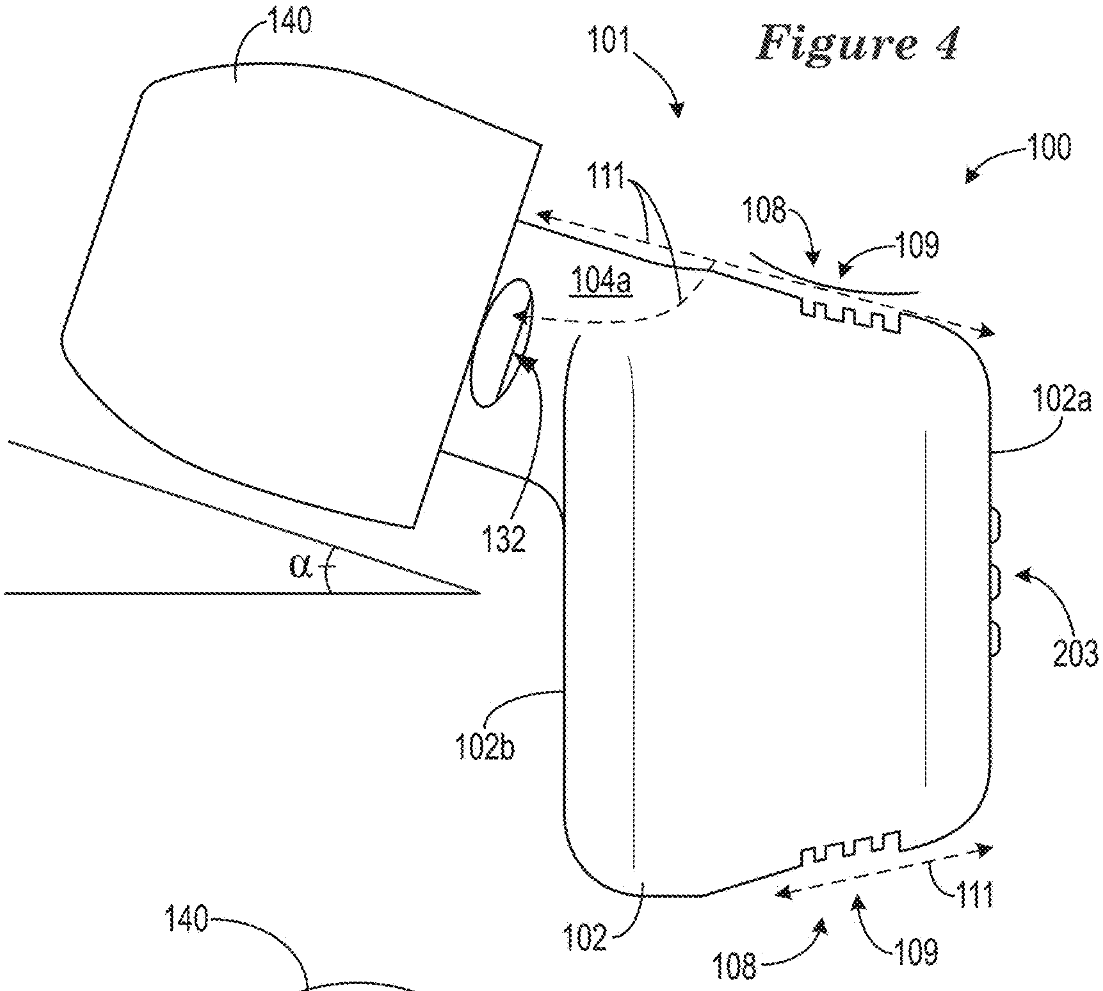
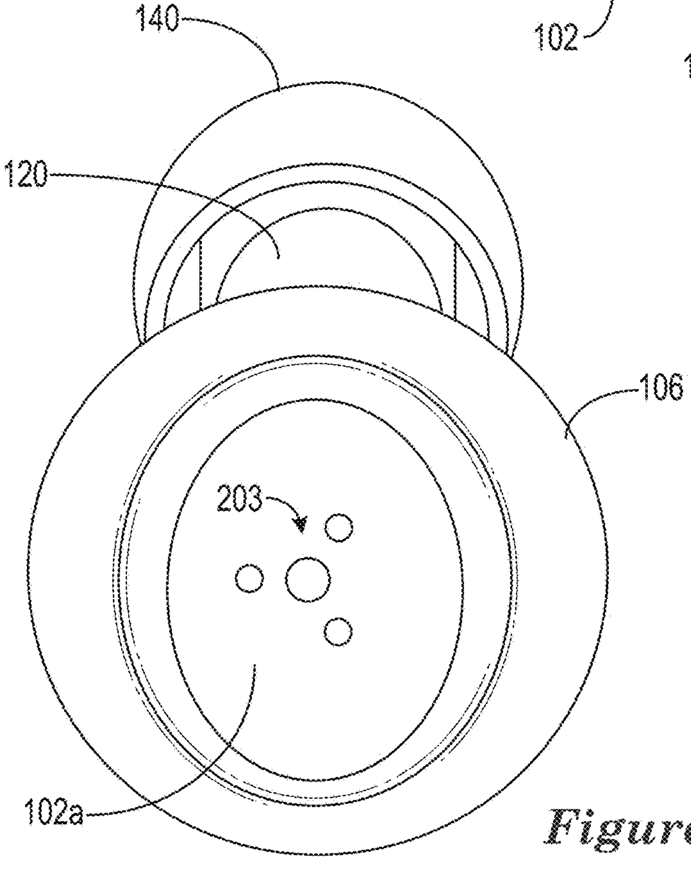
Figure 5

EAR-WEARABLE HEARING DEVICE

CROSS-REFERENCE TO RELATED APPLICATION

This application is a continuation of U.S. patent application Ser. No. 17/800,092 filed Aug. 16, 2022, which is a U.S. National Stage application under 35 U.S.C. 371 of PCT Application No. PCT/US2021/019680 filed Feb. 25, 2021, which claims the benefit of U.S. Provisional Application No. 62/981,814, filed Feb. 26, 2020, the disclosures of which are incorporated by reference herein in their entireties.

SUMMARY

This application relates generally to ear-level electronic systems and devices, including hearing aids, personal amplification devices, and hearables.

BRIEF DESCRIPTION OF THE DRAWINGS

The discussion below makes reference to the following figures:

FIG. 1 is an illustration of a human ear;

FIG. 2 illustrates various features of an ear-worn electronic hearing device in accordance with any of the embodiments disclosed herein;

FIG. 3 illustrates various features of an ear-worn electronic hearing device in accordance with any of the embodiments disclosed herein;

FIG. 4 illustrates various features of an ear-worn electronic hearing device in accordance with any of the embodiments disclosed herein;

FIG. 5 illustrates various features of an ear-worn electronic hearing device in accordance with any of the embodiments disclosed herein;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 6:
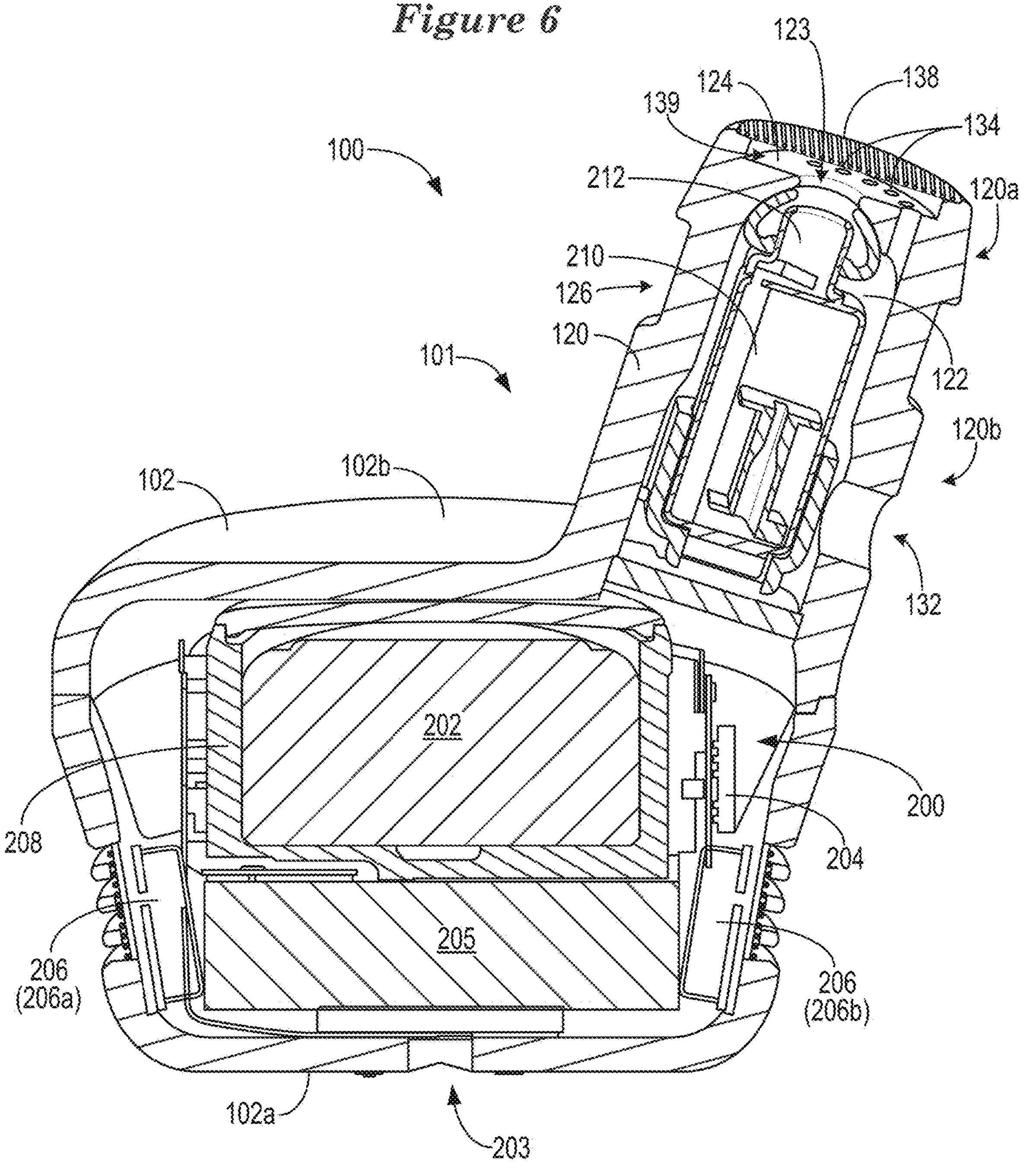
FIG. 6 illustrates various features of an ear-worn electronic hearing device in accordance with any of the embodiments disclosed herein.

Embodiments disclosed herein are directed to an ear-worn or ear-level electronic device. The devices depicted in the figures and described herein are intended to demonstrate the subject matter, but not in a limited, exhaustive, or exclusive sense. Ear-worn electronic devices (also referred to herein as “hearing devices”), such as hearables (e.g., wearable earphones, ear monitors, and earbuds), hearing aids, hearing instruments, hearing assistance devices, and hearing conservation devices typically include an enclosure, such as a housing or shell, within which internal components are disposed.

Typical components of a hearing device can include a processor (e.g., a digital signal processor or DSP), memory circuitry, power management and charging circuitry, one or more communication devices (e.g., one or more radio frequency radios, a near-field magnetic induction (NFMI) device), one or more antennas, one or more microphones, buttons and/or switches, and a receiver (e.g., a speaker), for example. Hearing devices can incorporate a long-range communication device, such as a Bluetooth® transceiver or other type of radio frequency (RF) transceiver.

The term hearing device of the present disclosure refers to a wide variety of ear-level electronic devices that can aid a person with impaired hearing. The term hearing device also refers to a wide variety of devices that can produce processed sound for persons with normal hearing. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a “hearing device,” which is understood to refer to a system comprising a single left ear device, a single right ear device, or a combination of a left ear device and a right ear device.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. An ear-worn electronic device comprises a housing configured to house electronic circuitry, a power source, at least one microphone, and a receiver or a speaker, the housing comprising a nozzle dimensioned for deployment within at least a portion of an ear canal. The nozzle comprises a distal portion and a proximal portion, a terminus surface at the distal portion comprising a sound port through which sound can pass out of the nozzle, a cavity within the nozzle, and an acoustical vent arrangement comprising a proximal port provided at the proximal portion, a plurality of distal ports provided at the terminus surface, each of the distal ports having a volume smaller than that of the proximal port, and at least a portion of the nozzle cavity in fluid communication with the proximal port and the distal ports. A volume of the proximal port is substantially equal to that of the distal ports collectively.

Example Ex2. An ear-worn electronic device configured for deployment at least partially in a concha and an ear canal of a wearer’s ear comprises a body dimensioned to rest within a portion of the concha when the device is deployed in the wearer’s ear, the body configured to house electronic circuitry, a power source, and at least one microphone, a receiver or a speaker operably coupled to the electronic circuitry, and a nozzle extending from the body and dimensioned for deployment within at least a portion of the ear canal. The nozzle comprises a distal portion and a proximal portion defined between the distal portion and the body, a terminus surface at the distal portion comprising a sound port through which sound can pass out of the nozzle, a cavity within the nozzle, and an acoustical vent arrangement comprising a proximal port provided at the proximal portion, a plurality of distal ports provided at the terminus surface, each of the distal ports having a volume smaller than that of the proximal port, and at least a portion of the nozzle cavity in fluid communication with the proximal port and the distal ports. A volume of the proximal port is substantially equal to that of the distal ports collectively.

Example Ex3. The device according to Ex1 or Ex2, wherein the receiver is situated within the nozzle cavity.

Example Ex4. The device according to Ex1, wherein the housing is configured to house audio amplification circuitry, and the speaker is situated within the nozzle cavity.

Example Ex5. The device according to Ex2, wherein the body is configured to house audio amplification circuitry, and the speaker is situated within the nozzle cavity.

Example Ex6. An ear-worn electronic device comprises a housing configured to house electronic circuitry, a power source, at least one microphone, and a receiver, the housing comprising a nozzle dimensioned for deployment within at least a portion of an ear canal. The nozzle comprises a distal portion and a proximal portion, a terminus surface at the distal portion comprising a sound port through which sound can pass out of the nozzle, a cavity configured to house the receiver, and an acoustical vent arrangement comprising a proximal port provided at the proximal portion, a plurality of distal ports provided at the terminus surface of the distal portion, each of the distal ports having a volume smaller than that of the proximal port, and at least a portion of the nozzle cavity in fluid communication with the proximal port and the distal ports. A volume of the proximal port is substantially equal to that of the distal ports collectively.

Example Ex7. An ear-worn electronic device configured for deployment at least partially in a concha and an ear canal of a wearer's ear comprises a body dimensioned to rest within a portion of the concha when the device is deployed in the wearer's ear, the body configured to house electronic circuitry, a power source, and at least one microphone, and a nozzle extending from the body and dimensioned for deployment within at least a portion of the ear canal. The nozzle comprises a distal portion and a proximal portion defined between the distal portion and the body, a terminus surface at the distal portion comprising a sound port through which sound can pass out of the nozzle, a cavity configured to house a receiver, the receiver comprising a spout in fluid communication with the sound port, and an acoustical vent arrangement comprising a proximal port provided at the proximal portion, a plurality of distal ports provided at the terminus surface of the distal portion, each of the distal ports having a volume smaller than that of the proximal port, and at least a portion of the nozzle cavity in fluid communication with the proximal port and the distal ports. A volume of the proximal port is substantially equal to that of the distal ports collectively.

Example Ex8. The device according to any one or any combination of the preceding Examples, wherein the acoustical vent arrangement comprises a plurality of the proximal ports, the number of distal ports exceeds the number of proximal ports, and a volume of the proximal ports cumulatively is substantially equal to that of the distal ports cumulatively.

Example Ex9. The device according to any one or any combination of the preceding Examples, wherein a ratio of the number of distal to proximal ports is equal to or greater than two, three, four, five, six, seven, eight, nine, ten, eleven or twelve.

Example Ex10. The device according to any one or any combination of Ex1 through Ex8, wherein a ratio of the number of distal to proximal ports is equal to or greater than thirteen.

Example Ex11. The device according to any one or any combination of Ex1 through Ex8, wherein a ratio of the number of distal to proximal ports is equal to or greater than fifteen.

Example Ex12. The device according to any one or any combination of Ex1 through Ex8, wherein a ratio of the number of distal to proximal ports is equal to or greater than twenty.

Example Ex13. The device according to any one or any combination of the preceding Examples, wherein:

the terminus surface of the distal portion of the nozzle is substantially circular; and the distal ports are distributed along an arc of the terminus surface having a length less than a circumference of the terminus surface.

Example Ex14. The device according to Ex13, wherein the distal ports are distributed along an arc of the terminus surface having a length equal to about half of the circumference of the terminus surface.

Example Ex15. The device according to any one or any combination of the preceding Examples, wherein the proximal and distal ports are substantially circular or elliptical in cross-section, a diameter or a major axis of the proximal port or the proximal ports cumulatively ranges from about 1.6 mm to about 2.0 mm, and the collective diameters or major axes of the distal ports range from about 1.6 mm to about 2.0 mm.

Example Ex16. The device according to any one or any combination of Ex1 through Ex14, wherein the proximal and distal ports are substantially circular or elliptical in cross-section, a diameter or a major axis of the proximal port or the proximal ports cumulatively ranges from about 1.7 mm to about 1.9 mm, and the collective diameters or major axes of the distal ports range from about 1.7 mm to about 1.9 mm.

Example Ex17. The device according to any one or any combination of Ex1 through Ex14, wherein the proximal and distal ports are substantially circular or elliptical in cross-section, a diameter or a major axis of the proximal port or the proximal ports cumulatively is about 1.8 mm, and the collective diameters or major axes of the distal ports are equal to about 1.8 mm.

Example Ex18. The device according to any one or any combination of the preceding Examples, wherein the acoustical vent arrangement comprises a manually actuatable occlusion arrangement configured for movement relative to the distal ports between an occluding state and a non-occluding state.

Example Ex19. The device according to Ex18, wherein the acoustical vent arrangement comprises a movable element comprising a solid region or regions configured to block the plurality of distal ports in the occluding state, and an aperture region or regions comprising one or more apertures configured to facilitate fluid communication through the acoustical vent arrangement in the non-occluding state.

Example Ex20. The device according to Ex19, wherein the moveable element comprises a plate comprising a gripping arrangement configured to facilitate manual rotation of the moveable element relative to the terminus surface of the distal portion of the nozzle.

Example Ex21. The device according to any one or any combination of the preceding Examples, wherein the acoustical venting arrangement is configured to communicate full spectrum sound from an acoustic environment external of the wearer's ear to an ear drum of the wearer when the device is deployed in the wearer's ear.

Example Ex22. The device according to any one or any combination of Ex1 through Ex20, wherein the body is configured to house a radio frequency (RF) communication device configured to at least receive streaming RF audio signals from an external RF source, the receiver is configured to transduce the streaming RF audio signals to full spectrum audible sound, and the acoustical venting arrangement is configured to communicate full spectrum sound from an acoustic environment external of the wearer's ear to an ear drum of the wearer when the device is deployed in the wearer's ear.

Example Ex23. The device according to any one or any combination of Ex2 through Ex5 or any one or any combination of Ex7 through Ex22, wherein the body comprises at least one microphone port situated adjacent the at least one microphone, and the at least one microphone port comprises a concave region with apertures, the concave region having a depth sufficient to prevent tissue of the wearer's outer ear from blocking the apertures.

Example Ex24. The device according to Ex23, wherein the concave region has a depth sufficient to prevent tissue of the wearer's tragus or anti-tragus from blocking the apertures.

Example Ex25. The device according to Ex23 or Ex24, wherein the concave region is configured to create acoustic leakage between the body and tissue of the wearer's outer ear.

Example Ex26. The device according to any one or any combination of Ex23 through Ex25, wherein the concave region and the tissue of the wearer's outer ear define an acoustic port between the at least one microphone and an acoustic environment of the wearer external of the wearer's ear.

Example Ex27. The device according to any one or any combination of Ex23 through Ex26, wherein the body is configured to house a plurality of microphones and comprises a plurality of microphone ports situated adjacent the plurality microphones, each of the microphone ports comprising a concave region with apertures, the concave region having a depth sufficient to prevent tissue of the wearer's outer ear from blocking the apertures.

Example Ex28. The device according to any one or any combination of Ex23 through Ex27, wherein the body is configured to house a first microphone and a second microphone, the body comprises a first microphone port situated adjacent the first microphone and a second microphone port situated adjacent the second microphone, and each of the first and second microphone ports comprises a concave region with apertures, the concave region having a depth sufficient to prevent tissue of the wearer's outer ear from blocking the apertures.

Example Ex29. The device according to Ex28, wherein the first microphone port is situated at a location of the body opposite that of the second microphone port.

Example Ex30. The device according to Ex28, wherein the first and second microphone ports are situated on a substantially round portion of the body, and the first microphone port is spaced apart from the second microphone port by about 180 degrees.

Example Ex31. The device according to Ex28, wherein the first microphone and the first microphone port are arranged to align with a tragus of the wearer's outer ear when the device is deployed in the wearer's ear, and the second microphone and the second microphone port are arranged to align with an anti-tragus of the wearer's outer ear when the device is deployed in the wearer's ear.

Example Ex32. The device according to any one or any combination of Ex23 through Ex31, wherein the concave region of the microphone port or ports is configured to enhance wind noise resistance.

Example Ex33. An ear-worn electronic device configured for deployment at least partially in a concha and an ear canal of a wearer's ear, the device comprising a body configured to house electronic circuitry, a power source, and at least one microphone, the body dimensioned to rest within a portion of the concha when the device is deployed in the wearer's ear and comprising at least one microphone port situated adjacent the at least one microphone, the at least one microphone port comprising a concave region having one or more apertures, the concave region defining a channel through which sound external to the wearer's ear is communicated to the at least one microphone, a receiver or a speaker operably coupled to the electronic circuitry, and a nozzle extending from the body and dimensioned for deployment within at least a portion of the ear canal. The nozzle comprises a distal portion and a proximal portion defined between the distal portion and the body, and a terminus surface at the distal portion comprising a sound port through which sound can pass out of the nozzle.

Example Ex34. The device according to Ex33, wherein the concave region extends along an entire circumference of the body.

Example Ex35. The device according to Ex33, wherein the concave region extends along only a portion of a circumference of the body.

Example Ex36. The device according to one or more of Ex33 through Ex35, wherein the concave region has a depth sufficient to prevent tissue of the wearer's outer ear from blocking the channel.

Example Ex37. The device according to one or more of Ex33 through Ex36, wherein the concave region has a depth sufficient to prevent tissue of the wearer's tragus or anti-tragus from blocking the channel.

Example Ex38. The device according to one or more of Ex33 through Ex37, wherein the concave region is configured to enhance wind noise resistance.

Example Ex39. The device according to one or more of Ex33 through Ex38, further comprising any feature or combination of features recited in Ex23 through Ex32.

Example Ex40. An ear-worn electronic device configured for deployment at least partially in a concha and an ear canal of a wearer's ear, the device comprising a body configured to house electronic circuitry, a power source, and at least one microphone, the body dimensioned to rest within a portion of the concha when the device is deployed in the wearer's ear and comprising at least one microphone port situated adjacent the at least one microphone, the at least one microphone port comprising a concave region having one or more apertures, the concave region defining a channel through which sound external to the wearer's ear is communicated to the at least one microphone, a receiver or a speaker operably coupled to the electronic circuitry, and a nozzle extending from the body and dimensioned for deployment within at least a portion of the ear canal. The nozzle comprises a distal portion and a proximal portion defined between the distal portion and the body, and a terminus surface at the distal portion comprising a sound port through which sound can pass out of the nozzle. The nozzle and the body are configured to cooperatively facilitate a camming lock action when the body is rotated from an upper concha location to a resting position within a lower portion of the concha following insertion of the nozzle into the ear canal, and the concave region of the at least one microphone port has a depth sufficient to prevent tissue of the wearer's outer ear from blocking the channel when the body is in the resting position within the lower portion of the concha.

Example Ex41. The device according to Ex40, wherein the concave region has a depth sufficient to prevent tissue of the wearer's tragus or anti-tragus from blocking the at least one microphone port.

Example Ex42. The device according to Ex40 or Ex41, comprising a pliant sleeve covering at least the distal portion of the nozzle, wherein the nozzle is configured to self-center itself when the nozzle and pliant sleeve are inserted into the ear canal, and the body is configured to rotate from the upper concha location to the resting position within the lower portion of the concha following insertion of the nozzle into the ear canal so as to lock the device securely in the wearer's ear.

Example Ex43. The device according to one or more of Ex40 through Ex42, comprising a pliant sleeve covering at least the distal portion of the nozzle, wherein the distal portion of the nozzle and the pliant sleeve covering the distal portion are dimensioned to provide a sealed fit within a bony section of the wearer's ear canal.

Example Ex44. The device according to one or more of Ex40 through Ex43, wherein the distal portion of the nozzle and the pliant sleeve covering the distal portion are dimensioned to provide a non-anchoring sealed fit within the body section of the wearer's ear canal.

Example Ex45. The device according to one or more of Ex40 through Ex44, further comprising any feature or combination of features recited in Ex23 through Ex32.

Example Ex46. The device according to any one or any combination of Ex2 through Ex5 or any one or any combination of Ex7 through Ex45, wherein the body comprises a substantially circular portion configured to conform to a curvature of a lower portion of the concha.

Example Ex47. The device according to Ex46, wherein the substantially circular portion of the body has a diameter from about 12 mm to about 18 mm.

Example Ex48. The device according to Ex46, wherein the substantially circular portion of the body has a diameter from about 14 mm to about 16.5 mm.

Example Ex49. The device according to Ex46, wherein the substantially circular portion of the body has a diameter from about 15 mm to about 15.4 mm.

Example Ex50. The device according to Ex46, wherein the substantially circular portion of the body has a diameter of about 15.24 mm.

Example Ex51. The device according to any one or any combination of the preceding Examples, wherein the oblique angle is an angle from about 14 degrees to about 22 degrees.

Example Ex52. The device according to any one or any combination of Ex1 through Ex50, wherein the oblique angle is an angle from about 16 degrees to about 20 degrees.

Example Ex53. The device according to any one or any combination of Ex1 through Ex50, wherein the oblique angle is an angle from about 17 degrees to about 19 degrees.

Example Ex54. The device according to any one or any combination of Ex1 through Ex50, wherein the oblique angle is an angle of about 18 degrees.

Example Ex55. The device according to any one or any combination of the preceding Examples, wherein the nozzle has a substantially cylindrical shape.

Example Ex56. The device according to one or more of the preceding Examples, wherein the device is configured for interchangeable deployment in a right ear and in a left ear of the wearer.

Example Ex57. The device according to any one or any combination of Ex2 through Ex5 or any one or any combination of Ex7 through Ex56, wherein the nozzle and the body are configured to cooperatively facilitate a camming lock action when the device is deployed in the wearer's ear.

Example Ex58. The device according to Ex57, comprising a pliant sleeve covering an external surface of at least the distal portion of the nozzle, wherein the nozzle is configured to self-center itself when the nozzle and pliant sleeve are inserted into the ear canal, and the body is configured to rotate from an upper concha location to a resting position within a lower portion of the concha following insertion of the nozzle into the ear canal.

Example Ex59. The device according to any one or any combination of the preceding Examples, wherein the proximal portion of the nozzle is configured for deployment within a cartilaginous section of the wearer's ear canal, and the distal portion of the nozzle is configured for deployment within a bony section of the wearer's ear canal.

Example Ex60. The device according to any one or any combination of the preceding Examples, wherein the nozzle has an axial length dimensioned for deployment within the ear canal up to but not exceeding a first bend of the ear canal.

Example Ex61. The device according to any one or any combination of the preceding Examples, comprising a suspension arrangement disposed in the nozzle cavity and configured to mechanically isolate the receiver from a wall of the nozzle cavity.

Example Ex62. The device according to Ex61, wherein the suspension arrangement comprises a distal suspension member situated in the nozzle cavity adjacent the terminus surface of the distal portion and in contact with the receiver spout, and a proximal suspension member situated in the nozzle cavity adjacent the body and in contact with a proximal end portion of the receiver opposite the spout.

Example Ex63. The device according to Ex62, wherein the distal suspension member is configured to serve as a leaf spring mechanism, and the proximal suspension member comprises a pliant structure configured to cradle the proximal end portion of the receiver.

Example Ex64. The device according to any one or any combination of Ex61 through Ex63, wherein the suspensions arrangement comprises pliant material.

Example Ex65. The device according to Ex62 or Ex63, wherein the distal suspension member and the proximal suspension member comprise pliant elastomeric material.

Example Ex66. The device according to any one or any combination of the preceding Examples, comprising a detachable pliant sleeve configured for attachment on an external surface of at least the distal portion of the nozzle.

Example Ex67. The device according to Ex66, wherein the pliant sleeve is configured to provide a sealed fit between the at least the distal portion of the nozzle and the wearer's ear canal.

Example Ex68. The device according to any one or any combination of the preceding Examples, wherein the nozzle comprises a retention feature configured to receive a corresponding retention feature of a pliant sleeve dimensioned for removable attachment to at least the distal portion of the nozzle.

Example Ex69. An ear-worn electronic device comprises a housing configured to house electronic circuitry, a power source, at least one microphone, a receiver or a speaker disposed in, or operably coupled to, the housing, and a nozzle of the housing dimensioned for deployment within at least a portion of an ear canal of a wearer of the device. The nozzle comprises a distal portion and a proximal portion, a terminus surface at the distal portion comprising a sound port through which sound can pass out of the nozzle, a cavity within the nozzle, and an acoustical vent arrangement comprising a proximal port provided at the proximal portion, a plurality of distal ports provided at the terminus surface, each of the distal ports having a volume smaller than that of the proximal port, and at least a portion of the nozzle cavity in fluid communication with the proximal port and the distal ports. A volume of the proximal port is substantially equal to that of the distal ports collectively.

Example Ex70. The device according to Ex69, wherein the receiver is situated within the nozzle cavity, or the housing is configured to house audio amplification circuitry, and the speaker is situated within the nozzle cavity.

Example Ex71. The device according to Ex69 or Ex70, wherein the acoustical vent arrangement comprises a plurality of the proximal ports, the number of distal ports exceeds the number of proximal ports, and a volume of the proximal ports cumulatively is substantially equal to that of the distal ports cumulatively.

Example Ex72. The device according to one or more of Ex69 to Ex71, wherein the terminus surface of the distal portion of the nozzle is substantially circular, and the distal ports are distributed along an arc of the terminus surface having a length less than a circumference of the terminus surface.

Example Ex73. The device according to one or more of Ex69 to Ex72, wherein the proximal and distal ports are substantially circular or elliptical in cross-section; a diameter or a major axis of the proximal port or the proximal ports cumulatively ranges from about 1.6 mm to about 2.0 mm; and the collective diameters or major axes of the distal ports range from about 1.6 mm to about 2.0 mm.

Example Ex74. The device according to one or more of Ex69 to Ex73, wherein the acoustical vent arrangement comprises a manually actuatable occlusion arrangement configured for movement relative to the distal ports between an occluding state and a non-occluding state.

Example Ex75. The device according to one or more of Ex69 to Ex74, wherein the housing comprises a body configured to house at least the electronic circuitry, the power source, and the at least one microphone, the body comprises at least one microphone port situated adjacent the at least one microphone, and the at least one microphone port comprises a concave region with apertures, the concave region having a depth sufficient to prevent tissue of the wearer's outer ear from blocking the apertures.

Example Ex76. The device according to one or more of Ex69 to Ex75, wherein the housing comprises a body configured to house at least the electronic circuitry, the power source, and the at least one microphone, the nozzle extends at an oblique angle from an off-center location of the body, and the oblique angle is an angle from about 14 degrees to about 22 degrees.

Example Ex77. The device according to one or more of Ex69 to Ex76, wherein the housing comprises a body configured to house at least the electronic circuitry, the power source, and the at least one microphone, the body is dimensioned to rest within a portion of a concha when the device is deployed in the wearer's ear, and the nozzle and the body are configured to cooperatively facilitate a camming lock action when the body is rotated from an upper concha location to a resting position within a lower portion of the concha following insertion of the nozzle into the ear canal.

Example Ex78. The device according to Ex77, comprising a pliant sleeve covering at least the distal portion of the nozzle, wherein the nozzle is configured to self-center itself when the nozzle and pliant sleeve are inserted into the ear canal, and the body is configured to rotate from the upper concha location to the resting position within the lower portion of the concha following insertion of the nozzle into the ear canal so as to lock the device securely in the wearer's ear.

Example Ex79. The device according to one or more of Ex69 to Ex78, comprising a pliant sleeve covering at least the distal portion of the nozzle, wherein the distal portion of the nozzle and the pliant sleeve covering the distal portion are dimensioned to provide a non-anchoring sealed fit within a bony section of the wearer's ear canal.

Example Ex80. The device according to one or more of Ex69 to Ex79, wherein the device is configured for interchangeable deployment in a right ear and in a left ear of the wearer.

Example Ex81. The device according to one or more of Ex69 to Ex80, comprising a suspension arrangement disposed in the nozzle cavity and configured to mechanically isolate the receiver from a wall of the nozzle cavity.

Example Ex82. The device according to Ex81, wherein the suspension arrangement comprises a distal suspension member situated in the nozzle cavity adjacent the terminus surface of the distal portion and in contact with the receiver spout, and a proximal suspension member situated in the nozzle cavity adjacent the body and in contact with a proximal end portion of the receiver opposite the spout.

Example Ex83. The device according to one or more of Ex69 to Ex82, wherein the housing comprises a body configured to house at least the electronic circuitry, the power source, the at least one microphone, and a radio frequency (RF) communication device configured to at least receive streaming RF audio signals from an external RF source, the receiver or the speaker is configured to transduce the streaming RF audio signals to full spectrum audible sound, and the acoustical venting arrangement is configured to communicate full spectrum sound from an acoustic environment external of the wearer's ear to an ear drum of the wearer when the device is deployed in the wearer's ear.

FIG. 1 is an illustration of a human ear 10. The ear 10 illustrated in FIG. 1 shows a number of anatomical features near the earline 12, including the antitragus 14, concha 16, helix 18, and tragus 20. An ear canal 22 includes a proximal section 21 between the tragus 20 and a first bend 24 of the ear canal 22. A middle section 27 is shown between the first bend 24 and a second bend 26 of the ear canal 22. A distal section 29 is shown between the second bend 26 and an ear drum 28.

FIGS. 2-8 illustrate various features of an ear-worn electronic device 100 in accordance with any of the embodiments disclosed herein. It is understood that the disclosure is directed to an ear-worn electronic device 100 which can incorporate any one or any combination of the disclosed features. In the following discussion, the ear-worn electronic device 100 will be referred to as a hearing device for purposes of convenience.

According to any of the embodiments disclosed herein, the hearing device 100 includes a housing 101 configured to house electronic circuitry 200, a power source 202 (e.g., a rechargeable battery, such as a lithium-ion battery), at least one microphone 206, and an acoustic transducer 210, such as a receiver or a speaker. The housing 101 comprises a nozzle 120 dimensioned for deployment within at least a portion of an ear canal 22 of a wearer of the hearing device 100. In some configurations, the housing 101 includes a body 102 dimensioned for deployment within an outer ear of the wearer. In other configurations, the body 102 and nozzle 120 of the housing 101 are both dimensioned for deployment at least partially within the ear canal 22. For example, the housing 101 can have an ITC, CIC or IIC configuration.

The nozzle 120 includes a distal portion 120*a*, a proximal portion 120*b*, and a terminus surface 124 at the distal portion 120*b* comprising a sound port 123 through which sound can pass out of the nozzle 120. The nozzle 120 also includes a cavity 122 and an acoustical vent arrangement 130. The acoustical vent arrangement 130 includes a proximal port 132 provided at the proximal portion 120*b* of the nozzle 120 and a plurality of distal ports 134 provided at the terminus surface 124 of the distal portion 120*a*. Each of the distal ports 134 has a volume smaller than that of the proximal port 132. The acoustical vent arrangement 130 further includes at least a portion of the nozzle cavity 122 in fluid communication with the proximal port 132 and the distal ports 134. The proximal port 132 has a volume which is substantially equal to that of the distal ports 134 cumulatively (in the aggregate or collectively).

Figure 9:
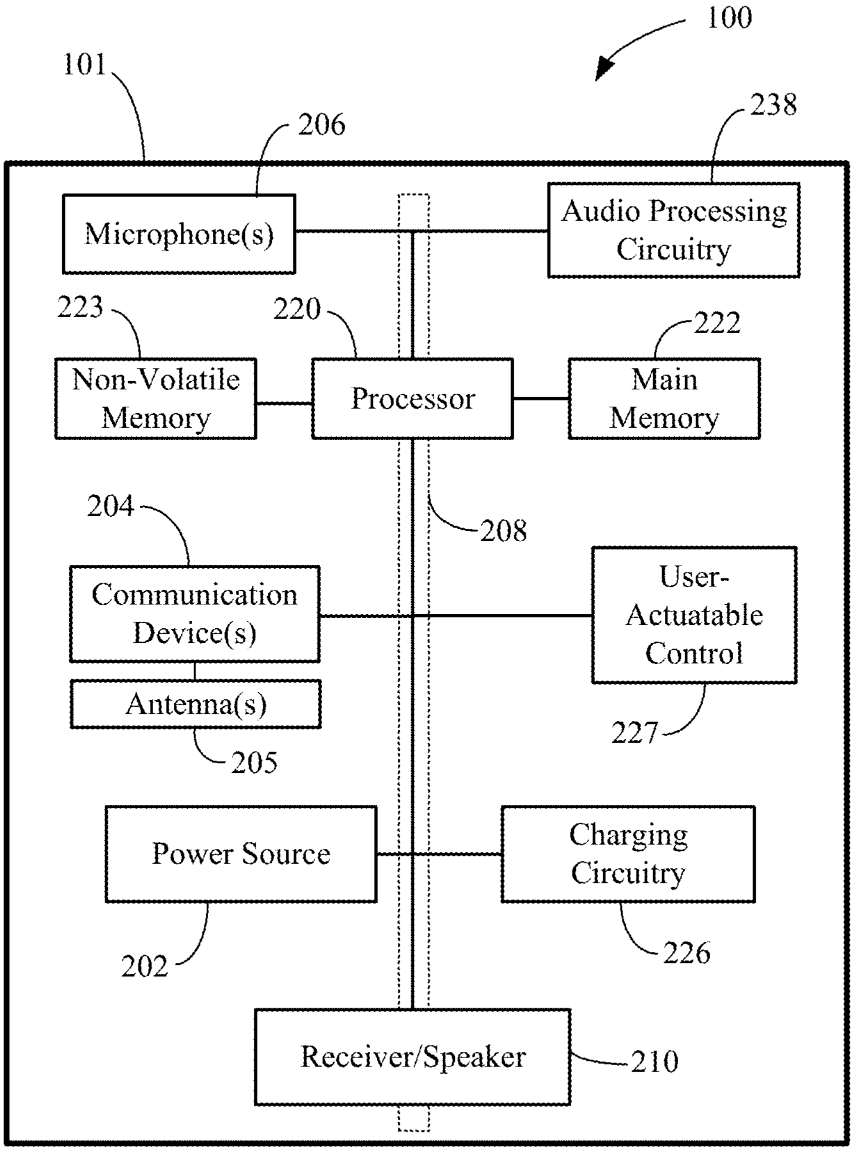
FIG. 9 is a system block diagram of an ear-worn electronic hearing device according to any of the embodiments disclosed herein.

In accordance with any of the embodiments disclosed herein, the hearing device 100 is configured for deployment at least partly in a concha 16 and an ear canal 22 of a wearer's ear 10. The hearing device 100 includes a body 102 dimensioned to rest within a portion (e.g., a lower portion) of the concha 16 when the hearing device 100 is deployed in the wearer's ear 10. The body 102 is configured to house a number of electronic and electrical components, representative examples of which are shown in FIG. 6 and FIG. 9. In the representative embodiment shown in FIG. 6, for example, the body 102 is configured to house electronic circuitry 200, a power source 202 (e.g., a rechargeable battery), and one or more microphones 206. In some configurations, the body 102 is configured to house a communication device(s) 204 (e.g., a radio frequency receiver or transceiver) and an antenna(s) 205. The hearing device 100 also includes an acoustic transducer 210, such as a receiver or a speaker, operably coupled to the electronic circuitry 200. The various electrical and electronic components of the hearing device 100 are electrically connected or coupled by way of a flexible printed circuit board 208.

The hearing device 100 includes a nozzle 120 dimensioned for deployment within at least a portion of the ear canal 22. For example, the nozzle 120 has a generally cylindrical shape and an axial length that allows the nozzle 120 to be advanced up to, but not past, the first bend 24 of the ear canal 22. The nozzle 120 includes a distal portion 120*a*, a proximal portion 120*b*, and a terminus surface 124 at the distal portion 120*b* comprising a sound port 123 through which sound can pass out of the nozzle 120. The nozzle 120 also includes a cavity 122 and an acoustical vent arrangement 130. In some configurations, a receiver 210 is situated in the nozzle cavity 122 and operably coupled to the electronic circuitry 200. In other configurations, a speaker 210 is situated in the nozzle cavity 122 and operably coupled to audio amplification circuitry of the electronic circuitry 200 situated in the body 120.

The acoustical vent arrangement 130 includes a proximal port 132 provided at the proximal portion 120*b* of the nozzle 120 and a plurality of distal ports 134 provided at the terminus surface 124 of the distal portion 120*a*. Each of the distal ports 134 has a volume smaller than that of the proximal port 132. The acoustical vent arrangement 130 further includes at least a portion of the nozzle cavity 122 in fluid communication with the proximal port 132 and the distal ports 134. The proximal port 132 has a volume which is substantially equal to that of the distal ports 134 cumulatively (in the aggregate or collectively). A protective screen 138 is disposed at the terminal tip of the distal portion 120*a* and covers the terminus surface 124 and distal ports 134. A gap 139 is provided between the terminus surface 124 and the screen 138. The gap 139 is sized (e.g., 0.5 mm) to create an acoustic transparency effect while keeping out water and debris. The acoustical vent arrangement 130 and gap 139 are configured and volumetrically sized to provide unrestricted fluid flow through the nozzle 120.

Advantageously, the acoustical vent arrangement 130 is configured to communicate full spectrum sound (e.g., from 20 Hz to 20 kHz) from an acoustic environment external of the wearer's ear 10 to the wearer's ear drum 28 when the hearing device 100 is deployed in the wearer's ear 10. For embodiments that include a radio frequency communication device 204 and antenna 205, the hearing device 100 can be configured to receive streaming RF audio signals from an external RF source. The communication device 204 is configured to transduce the streaming RF audio signals to full spectrum audible sound. In such embodiments, the hearing device 100 provides full spectrum sound to the wearer's eardrum 28 whether the sound is received from the wearer's external acoustic environment or derived from streaming RF audio signals (and communicated to the wearer's ear via a receiver or a speaker).

Figure 7:
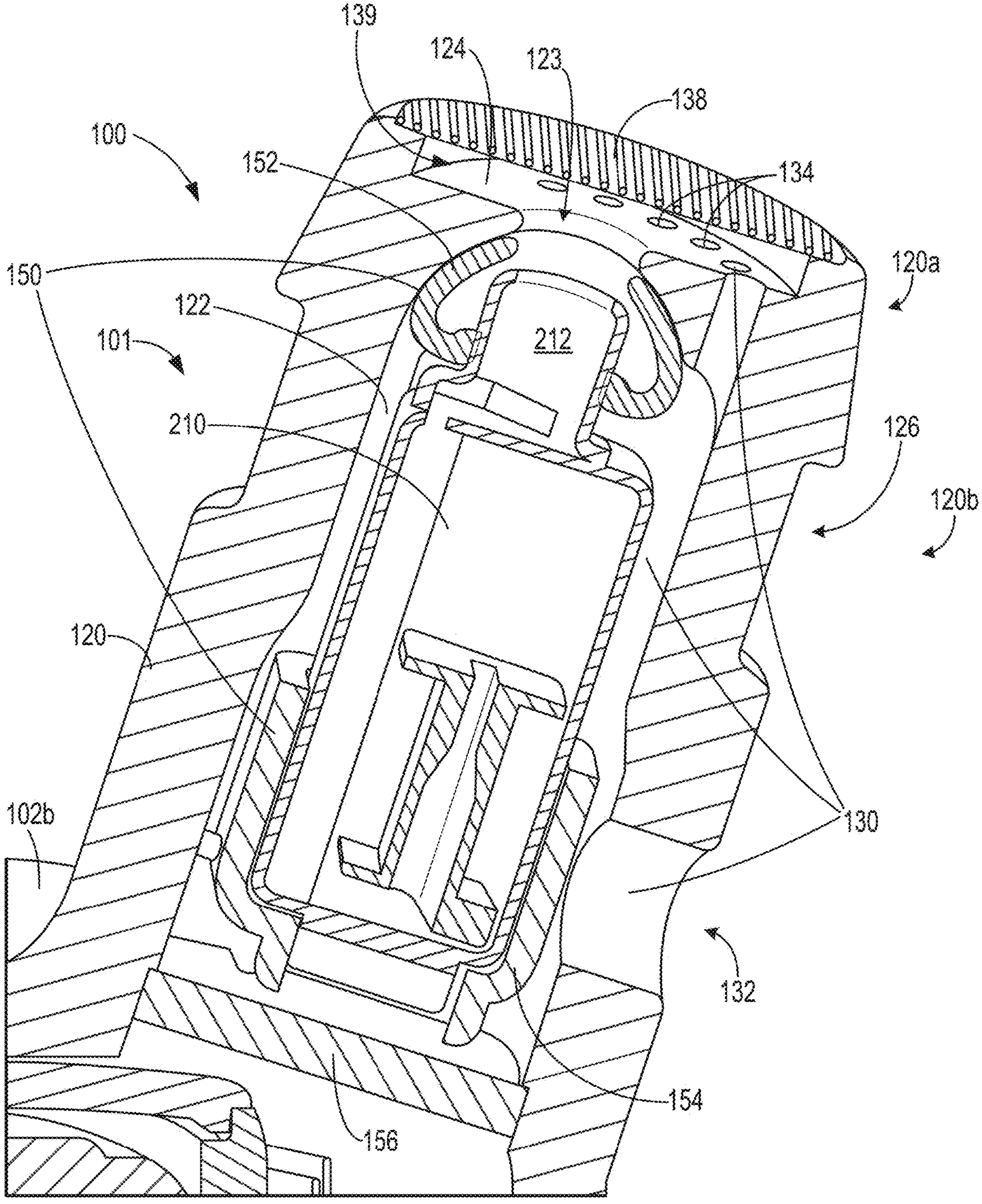
FIG. 7 illustrates various features of an ear-worn electronic hearing device in accordance with any of the embodiments disclosed herein.

The acoustical vent arrangement 130 shown in FIGS. 6 and 7 includes a single large proximal port 132 and a plurality of small distal ports 134. In some configurations, the acoustical vent arrangement 130 can include a plurality of large proximal ports 132 (e.g., two, three or four proximal ports) in addition to a plurality of small distal ports 134, such that the number of distal ports exceeds the number of proximal ports. As previously discussed, the cumulative volume of the multiplicity of large proximal ports is substantially equal to the cumulative volume of the multiplicity of small distal ports. In some configurations, the ratio of the number of distal ports to the number of proximal ports can be equal to or greater than two, three, four, five, six, seven, eight, nine, ten, eleven or twelve (e.g., 12 distal ports and 1 proximal port). In other configurations, the ratio of the number of distal ports to the number of proximal ports can be equal to or greater than thirteen (e.g., a ratio from 13 to 20).

Figure 8:
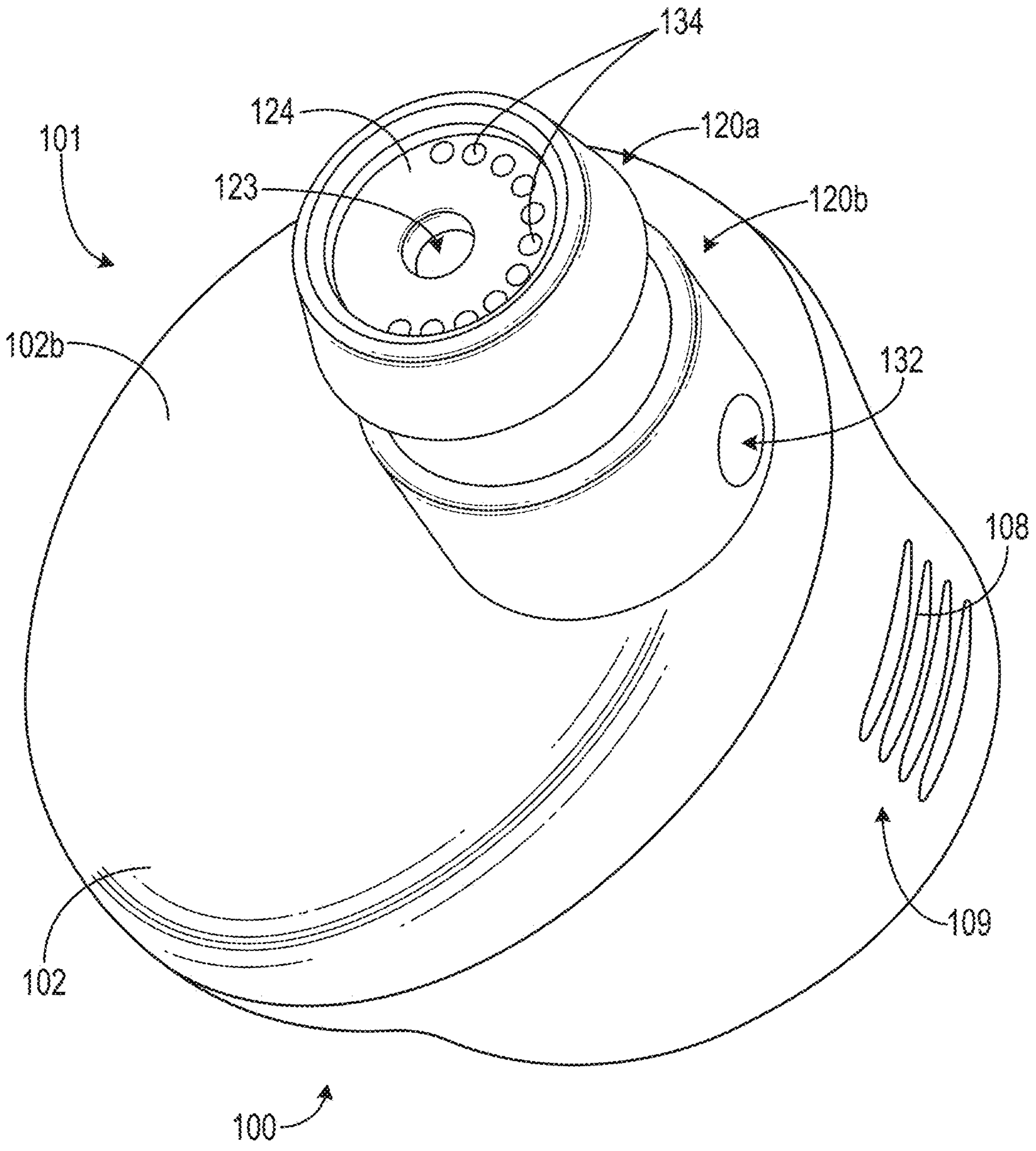
FIG. 8 illustrates various features of an ear-worn electronic hearing device in accordance with any of the embodiments disclosed herein.

As is best seen in FIG. 8, the terminus surface 124 of the distal portion 120*a* of the nozzle 120 is substantially circular and the distal ports 134 are distributed along an arc of the terminus surface 124 having a length less than a circumference of the terminus surface 124. For example, the distal ports 134 can be distributed along an arc of the terminus surface 124 having a length equal to about half of the circumference of the terminus surface 124. It is understood that the distal ports 134 can be distributed along an arc of the terminus surface 124 having a length equal to the entire circumference of the terminus surface 124. It is also understood that the distal ports 134 can be distributed in accordance with any pattern, and need not be distributed along an arcuate path.

According to some configurations, the acoustical vent arrangement 130 can include a wearer-actuatable occlusion arrangement configured for movement relative to the distal ports 134 between an occluding state and a non-occluding state. In some configurations, the occlusion arrangement can be configured to move between the occluding state, the non-occluding state, and any number of partially-occluding states. The acoustical vent arrangement 130 can include a movable element comprising a solid region or regions configured to block the plurality of distal ports 134 in the occluding state. The movable element includes an aperture region or regions comprising one or more apertures configured to facilitate fluid communication through the acoustical vent arrangement 130 and the non-occluding state. For example, the movable element can comprise a plate comprising a gripping arrangement configured to facilitate manual rotation (e.g., twisting) of the movable element relative to the terminus surface 124 of the distal portion 120*a* of the nozzle 120.

In some configurations, the proximal and distal ports 132, 134 can be substantially circular in cross section. In other configurations, the proximal and distal ports 132, 134 can be substantially elliptical or oval in cross section. In further configurations, the proximal and distal ports 132, 134 can have different cross-sectional shapes (e.g., circular, elliptical, polygonal). In some configurations, the proximal and distal ports are substantially circular or elliptical in cross-section, a diameter or major axis of the proximal port or the proximal ports cumulatively ranges from about 1.6 mm to about 2.0 mm, and the collective diameters or major axes of the distal ports range from about 1.6 mm to about 2.0 mm. In other configurations, the proximal and distal ports are substantially circular or elliptical in cross-section, a diameter or major axis of the proximal port or the proximal ports cumulatively ranges from about 1.7 mm to about 1.9 mm, and the collective diameters or major axes of the distal ports range from about 1.7 mm to about 1.9 mm. In further configurations, the proximal and distal ports are substantially circular or elliptical in cross-section, a diameter or major axis of the proximal port or the proximal ports cumulatively is about 1.8 mm, and the collective diameters or major axes of the distal ports are equal to about 1.8 mm.

According to any of the embodiments disclosed herein, the nozzle 120 can extend at an oblique angle, α, from an off-center location 104 of the body 102. As shown in FIG. 4, the nozzle 120 extends at the oblique angle, α, from a distal surface 102*b* of the body 102 at or near the peripheral edge 104*a* of the body 102. The oblique angle, α, is an angle defined between a plane perpendicular to the distal surface 102*b* of the body 102 and a longitudinal axis of the nozzle 120. In some configurations, the oblique angle, α, can be an angle from about 14 degrees to about 22 degrees. In other configurations, the oblique angle, α, can be an angle from about 16 degrees to about 20 degrees. In further configurations, the oblique angle, α, can be an angle from about 17 degrees to about 19 degrees. In one particular configuration, the oblique angle, α, can be an angle of about 18 degrees. According to any of the embodiments disclosed herein, the proximal portion 120*b* of the nozzle 120 can have an axial length that corresponds to an average axial length of the cartilaginous section of the ear canal 22. The distal portion 120*a* of the nozzle 120 can have an axial length that corresponds to an average axial length of the bony section of the ear canal 22.

The body 102 of the hearing device 100 includes a proximal surface 102*a*, a distal surface 102*b*, and a substantially circular peripheral portion 106 having a specified diameter. A charging interface 203 is disposed on the proximal surface 102*a* of the body 102. The charging interface 203 includes anode and cathode electrodes configured to electrically couple to corresponding charging contacts of an external charging unit. As shown, the substantially circular peripheral portion 106 is situated at the edge of, or near, the distal surface 102*b* of the body 102. As can be seen, the body 102 tappers inwardly (with a progressively reduced diameter) from the substantially circular peripheral portion 106 to the proximal surface 102*a*.

The diameter of the substantially circular peripheral portion 106 of the body 102 was determined empirically by the inventors to facilitate a good (e.g., snug) fit of the body 102 in a lower portion of the concha 16. It was found that the empirically-derived diameter of the circular peripheral portion 106 of the body 102 provides for a good fit within the concha 16 for a wide range of individuals, including youths, adults, and persons of either gender. As such, it is understood that, although described as being "substantially circular," the peripheral portion 106 of the body 102 may have a shape that deviates somewhat from a perfect circle in order to achieve a universal fit for wearers having wide variation in outer and inner ear anatomy. For example, and from a geometric perspective, the peripheral portion 106 of the body 102 can have a slightly or generally elliptical shape, such that the major axis of the resulting ellipse corresponds to the term "diameter" used in the context of the disclosed embodiments and claims appended hereto.

In some configurations, the substantially circular peripheral portion 106 of the body 102 can have a diameter (or major axis) from about 12 mm to about 18 mm. In other configurations, the substantially circular peripheral portion 106 of the body 102 can have a diameter (or major axis) from about 14 mm to about 16.5 mm. In further configurations, the substantially circular peripheral portion 106 of the body 102 can have a diameter (or major axis) from about 15.1 mm to about 15.4 mm. In some configurations, the substantially circular peripheral portion 106 of the body 102 can have a diameter (or major axis) from about 15.2 mm to about 15.3 mm. In one particular configuration, the substantially circular peripheral portion 106 of the body 102 can have a diameter (or major axis) of about 15.24 mm.

During use of the hearing device 100, a detachable pliant sleeve 140 (e.g., a soft elastomeric material such as silicone) is removably affixed to an external surface of at least the distal portion 120*a* of the nozzle 120. As can be seen in FIGS. 6 and 7, the nozzle 120 includes a recessed region 126 that extends around all or portion of the periphery of the nozzle 120. The recessed region 126 is configured to receive a corresponding protruding region of an inner surface of the pliant sleeve 140, thereby providing an interlocking or interference fit between the pliant sleeve 140 and the nozzle 120. In some configurations, the pliant sleeve 140 can cover the entirety of the distal portion 120*a* and all or only a portion of the proximal portion 120*b* of the nozzle 120. Although not shown, it is understood that the distal tip of the pliant sleeve 140 includes an aperture to allow sound to exit the terminus surface 124 of the nozzle 120 via the sound port 123 (shown in FIGS. 6-8). The pliant sleeve 140 is configured to provide a sealed fit between at least the distal portion 120*a* of the nozzle 120 and the wearer's ear canal 22 (e.g., within the bony section of the ear canal 22).

The nozzle 120 and the body 102 are configured to cooperatively facilitate a camming lock action when the hearing device 100 is deployed in the wearer's ear 10 with the pliant sleeve 140 attached thereto. It was found that the combination of the axial length and oblique angle, α, of the nozzle 120 relative to the body 102 and the diameter of the circular peripheral portion 106 of the body 102 facilitates a camming action which locks (e.g., snugly engages or secures) the body 102 in a lower portion of the wearer's concha 16 when the hearing device 100 is deployed in the wearer's ear 10. More particularly, the nozzle 120 is configured to self-center itself when the nozzle 120 and pliant sleeve 140 are inserted into the ear canal. The body 102 is configured to rotate from an upper concha location to a stable resting position within the lower portion of the concha following insertion of the nozzle 120 into the ear canal 22. In this orientation, the hearing device 100 is securely deployed in the wearer's ear 10 and remains positionally stable during use.

In accordance with any of the embodiments disclosed herein, the hearing device 100 is configured for interchangeable deployment in a right ear and in a left ear of a wearer. The combination of the axial length and oblique angle, α, of the nozzle 120 relative to the body 102 and the diameter of the circular peripheral portion 106 of the body 102 provides for a universal (e.g., aurally ambidextrous) fit of the hearing device 100 in a wearer's left ear or right ear. The universal fit aspect of the hearing device 100 advantageously eliminates the cost and complexity of manufacturing separate left and right hearing devices.

According to any of the embodiments disclosed herein, the hearing device 100 can incorporate one or more comfort-enhancing features described herein. According to one comfort-enhancing feature, the nozzle 120 and pliant sleeve 140 are configured to facilitate minimum contact between the nozzle 120/pliant sleeve 140 and a wearer's ear canal 22. The distal portion 120*a* of the nozzle covered by the pliant sleeve 140 is configured for deployment within the bony section of the wearer's ear canal 22 and provides an acoustic seal within the bony section of the ear canal 22. In some configurations, although providing acoustic sealing, the distal portion 120*a* of the nozzle 120 covered by the pliant sleeve 140 is not configured to anchor the nozzle within the ear canal 22, which can disadvantageously cause pain during relative movement between the covered nozzle 120 and the wearer's ear canal 22 (e.g., during eating or talking).

The proximal portion 120*b* is configured for deployment within the cartilaginous section of the wearer's ear canal 22. More particularly, the distal portion 120*a* covered by the pliant sleeve 140 is configured to have greater contact (e.g., maximum contact) with the wearer's ear canal 22 than the proximal portion 120*b*, which may not be covered by the pliant sleeve 140 or only partially covered by the pliant sleeve 140. The proximal portion 120*b* of the nozzle 120 is configured to have reduced contact (e.g., minimum contact) relative to the pliant sleeve 140 section covering the distal portion 120*a*. The increased (e.g., maximum) contact between the ear canal 22 and the distal portion 120*a* covered by the pliant sleeve 140 can be well-tolerated by the wearer because of the reduced level of nozzle movement within the bony section of the ear canal 22. In contrast, the cartilaginous section of the ear canal 22 is subject to movement, such as during eating and speaking by the wearer. The reduced (e.g., minimum) contact between the nozzle 120 (with or without a pliant sleeve covering) and the ear canal 22 at the proximal portion 120*b* is well-tolerated by the wearer due to the reduced diameter of this portion of the nozzle 120 within the cartilaginous section of the ear canal 22.

In accordance with any of the embodiments disclosed herein, and with particular reference to FIG. 4, the body 102 of the hearing device 100 includes at least one microphone port 108 situated adjacent at least one microphone 206 (see, e.g., FIG. 6). In FIG. 4 and other figures, the body 102 includes a pair of microphone ports 108*a* and 108*b*, which are positioned adjacent a pair of microphones 206*a* and 206*b*. The microphone 206*a* can be situated at a location of the body 102 opposite that of microphone 206*b*. For example, the circumferential edge surface of the body 102 can have a substantially circular cross section, and microphone 206*a* can be spaced apart from microphone 206*b* by about 180 degrees. By way of further example, the microphones 206 can be spaced apart from one another such that a first microphone 206*a* is aligned with a tragus and a second microphone 206*b* is aligned with an anti-tragus of the wearer's outer ear when the hearing device 100 is deployed in the wearer's ear 10. It is understood that the body 102 can include one, two, three or any number of microphone ports 108 and corresponding microphones 206.

Each of the microphone ports 108 comprises a concave region 109 having one or more apertures. The apertures allow sound impinging at the microphone port 108 to be sensed by a microphone 206. Each of the microphone ports 108 includes an internal barrier layer which renders the hearing device 100 impervious to moisture and debris. The concave region 109 has a depth sufficient to prevent tissue of the wearer's outer ear (e.g., tissue of the tragus or anti-tragus) from blocking a microphone port 108. In some configurations, the concave region 109 extends along an entire circumference of the body 102. In other configurations, the concave region 109 extends along only a portion of the circumference of the body 102 (e.g., a portion of the body 102 adjacent a microphone port 108).

The concave region 109 is configured to create acoustic leakage between the body 102 of the hearing device 100 and tissue of the wearer's outer ear (e.g., tissue of the tragus or anti-tragus). The concave region 109 defines a channel 111 through which sound external to the wearer's ear 10 is communicated to a microphone 206. As such, the combination of the concave region 109 of the hearing device 100 and the tissue of the wearer's outer ear define an acoustic port between a microphone 206 and an acoustic environment of the wearer external of the wearer's ear 10. The concave region 109 also provides a channel 111 through which sound external of the wearer's ear 10 is communicated to the proximal port 132 of the acoustical vent arrangement 130. Advantageously, the concave region 109 is configured to enhance wind noise resistance.

In accordance with any of the embodiments disclosed herein, the nozzle 120 includes a suspension arrangement 150 disposed in the nozzle cavity 122. The suspension arrangement 150 is configured to mechanically isolate the receiver or speaker 210 from a wall of the nozzle cavity 122. According to one configuration, the suspension arrangement 150 comprises or is constructed from a pliant material, such as an elastomeric material (e.g., silicone).

As is shown in the embodiments illustrated in FIGS. 6 and 7, the suspension arrangement 150 includes a distal suspension member 152 situated in the nozzle cavity 122 adjacent the terminus surface 124 of the distal portion 120*a* of the nozzle 120. The distal suspension member 152 contacts and preferably encompasses at least a distal portion of the receiver or speaker 212. In FIGS. 6 and 7, the distal suspension member 152 is shown contacting and encircling the spout 212 of the receiver 210. The distal suspension member 152 comprises a pliant structure (e.g., an elastomeric material, such as silicone). In some configurations, the distal suspension member 152 is configured to serve as a leaf spring mechanism.

The suspension arrangement 150 also includes a proximal suspension member 154 situated in the nozzle cavity 122 adjacent a rear hatch 156. The rear hatch 156 is positioned adjacent the body 102 and is configured to seal and locate the receiver or speaker 210 away from any electrical circuit noise emanating from components housed in the body 102. The proximal suspension member 154 is configured to contact and preferably encompass a proximal end portion of the receiver or speaker 210 opposite the spout 212. The proximal suspension member 154 comprises a pliant structure (e.g., an elastomeric material, such as silicone) and is configured to cradle the proximal and portion of the receiver or speaker 210.

FIG. 9 is a block diagram that illustrates an ear-worn electronic device 100 in accordance with any of the embodiments disclosed herein. The hearing device 100 includes a housing 101 configured to be worn in an ear of a wearer. The hearing device 100 shown in FIG. 9 can represent a single hearing device configured for monaural or single-ear operation or one of a pair of hearing devices configured for binaural or dual-ear operation. The housing 101 contains or supports various components, representative examples of which are shown in FIG. 9.

The hearing device 100 includes a processor 220 operatively coupled to a main memory 222 and a non-volatile memory 223. The processor 220 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 220 can include or be operatively coupled to main memory 222, such as RAM (e.g., DRAM, SRAM). The processor 220 can include or be operatively coupled to non-volatile memory 223, such as ROM, EPROM, EEPROM or flash memory. The non-volatile memory 223 is configured to store program instructions executable by the processor 220 for controlling and implementing various operations performed by the hearing device 100.

The hearing device 100 includes an audio processing facility operably coupled to, or incorporating, the processor 220. The audio processing facility includes audio signal processing circuitry 238 (e.g., analog front-end, analog-to-digital converter, digital-to-analog converter, DSP, and various analog and digital filters), a microphone arrangement 206, and a speaker or receiver 210. The microphone arrangement 206 can include one or more discrete microphones or a microphone array(s) (e.g., configured for microphone array beamforming). Each of the microphones of the microphone arrangement 206 can be situated at different locations of the housing 101. It is understood that the term microphone used herein can refer to a single microphone or multiple microphones unless specified otherwise.

The hearing device 100 may also include a user interface with a user-actuatable control 227 operatively coupled to the processor 220. The user-actuatable control 227 is configured to receive an input from the wearer of the hearing device 100. The input from the wearer can be any type of user input, such as a touch input, a gesture input, or a voice input.

The hearing device 100 can include one or more communication devices 204 coupled to one or more antennas 205. For example, the one or more communication devices 204 can include one or more radios that conform to an IEEE 802.11 (e.g., WiFi®) or Bluetooth® (e.g., BLE, Bluetooth® 4.2, 5.0, 5.1, 5.2 or later) specification, for example. In addition, or alternatively, the hearing device 100 can include a near-field magnetic induction (NFMI) sensor (e.g., an NFMI transceiver coupled to a magnetic antenna) for effecting short-range communications (e.g., ear-to-ear communications, ear-to-kiosk communications).

The hearing device 100 also includes a power source 202, which can be a conventional battery, a rechargeable battery (e.g., a lithium-ion battery), or a power source comprising a supercapacitor. The power source 202 is operably coupled to power management circuitry for supplying power to various components of the hearing device 100. In embodiments which include a rechargeable power source 202, charging circuity 226 is coupled to the rechargeable power source 202. The charging circuitry 226 is electrically coupled to charging contacts 203 on the housing 101 which are configured to electrically couple to corresponding charging contacts of a charging unit when the hearing device 100 is placed in the charging unit. The various electrical and electronic components of the hearing device 100 shown in FIG. 9 are electrically connected or coupled by way of a flexible printed circuit board 208.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms “a,” “an,” and “the” encompass embodiments having plural referents, unless the content clearly dictates otherwise. As used in this specification and the appended claims, the term “or” is generally employed in its sense including “and/or” unless the content clearly dictates otherwise.

As used herein, “have,” “having,” “include,” “including,” “comprise,” “comprising” or the like are used in their open-ended sense, and generally mean “including, but not limited to.” It will be understood that “consisting essentially of,” “consisting of,” and the like are subsumed in “comprising,” and the like. The term “and/or” means one or all of the listed elements or a combination of at least two of the listed elements.

The phrases “at least one of,” “comprises at least one of,” and “one or more of” followed by a list refers to any one of the items in the list and any combination of two or more items in the list.

What is claimed is:

1. An ear-worn electronic device configured for deployment at least partially in a concha and an ear canal of a wearer’s ear, the device comprising:

a body configured to house a power source, electronic circuitry, and at least one microphone, the body dimensioned to rest within a portion of the concha when the device is deployed in the wearer’s ear and comprising at least one microphone port situated adjacent the at least one microphone, the at least one microphone port comprising a concave region on an outer surface of the body and having one or more apertures, the concave region defining a channel through which sound external to the wearer’s ear is communicated to the at least one microphone, the concave region configured to create acoustic leakage between the body and tissue of the wearer’s outer ear;

a receiver or a speaker operably coupled to the electronic circuitry; and a nozzle extending from the body and dimensioned for deployment within at least a portion of the ear canal, the nozzle comprising:

a distal portion and a proximal portion defined between the distal portion and the body; and a terminus surface at the distal portion comprising a sound port through which sound can pass out of the nozzle.

2. The device according to claim 1, wherein the concave region extends along an entire circumference of the body.

3. The device according to claim 1, wherein the concave region extends along only a portion of a circumference of the body.

4. The device according to claim 1, wherein the concave region is configured to prevent tissue of the wearer’s outer ear from blocking the channel.

5. The device according to claim 1, wherein the concave region is configured to prevent tissue of the wearer’s tragus or anti-tragus from blocking the channel.

6. The device according to claim 1, wherein the concave region and tissue of the wearer’s ear define an acoustic port between the at least one microphone and an acoustic environment of the wearer external of the wearer’s ear.

7. The device according to claim 1, wherein the concave region is configured to enhance wind noise resistance.

8. The device according to claim 1, wherein:

the nozzle comprises an acoustical vent arrangement comprising a proximal port provided at the proximal portion and a plurality of distal ports provided at the terminus surface; and the concave region is configured to facilitate communication of sound external to the wearer’s ear to the proximal port.

9. The device according to claim 8, wherein a volume of the proximal port is substantially equal to that of the distal ports collectively.

10. The device according to claim 1, wherein the nozzle and the body are configured to cooperatively facilitate a camming lock action when the body is rotated from an upper concha location to a resting position within a lower portion of the concha following insertion of the nozzle into the ear canal.

11. The device according to claim 1, wherein the receiver or the speaker is situated within the nozzle.

12. An ear-worn electronic device configured for deployment at least partially in a concha and an ear canal of a wearer’s ear, the device comprising:

a body configured to house a power source, electronic circuitry, and at least one microphone, the body dimensioned to rest within a portion of the concha when the device is deployed in the wearer’s ear and comprising at least one microphone port situated adjacent the at least one microphone, the at least one microphone port comprising a concave region on an outer surface of the body and having one or more apertures and extending along at least a portion of a circumference of the body, the concave region defining a channel through which sound external to the wearer’s ear is communicated to the at least one microphone and configured to prevent tissue of the wearer’s outer ear from blocking the channel;

a receiver or a speaker operably coupled to the electronic circuitry; and a nozzle extending from the body and dimensioned for deployment within at least a portion of the ear canal, the nozzle comprising:

a distal portion and a proximal portion defined between the distal portion and the body; and a terminus surface at the distal portion comprising a sound port through which sound can pass out of the nozzle.

13. The device according to claim 12, wherein the concave region extends along an entire circumference of the body.

14. The device according to claim 12, wherein the concave region extends along only a portion of a circumference of the body.

15. The device according to claim 12, wherein the concave region is configured to prevent tissue of the wearer’s tragus or anti-tragus from blocking the channel.

16. The device according to claim 12, wherein the concave region is configured to create acoustic leakage between the body and tissue of the wearer’s outer ear.

17. The device according to claim 12, wherein the concave region and tissue of the wearer’s ear define an acoustic port between the at least one microphone and an acoustic environment of the wearer external of the wearer’s ear.

18. The device according to claim 12, wherein the concave region is configured to enhance wind noise resistance.

19. The device according to claim 12, wherein:

the nozzle comprises an acoustical vent arrangement comprising a proximal port provided at the proximal portion and a plurality of distal ports provided at the terminus surface; and the concave region is configured to facilitate communication of sound external to the wearer's ear to the proximal port.

20. The device according to claim 19, wherein a volume of the proximal port is substantially equal to that of the distal ports collectively.

* * * * *